(12) United States Patent
Banzola

(10) Patent No.: US 11,541,519 B2
(45) Date of Patent: Jan. 3, 2023

(54) TORQUE WRENCH AND METHOD FOR CONTROLLED TIGHTENING OF THREADED COUPLINGS USING A TORQUE WRENCH

(71) Applicant: Giovanni Banzola, Modena (IT)

(72) Inventor: Giovanni Banzola, Modena (IT)

( * ) Notice: Subject to any disclaimer, the term of this patent is extended or adjusted under 35 U.S.C. 154(b) by 78 days.

(21) Appl. No.: 16/491,967

(22) PCT Filed: Mar. 20, 2018

(86) PCT No.: PCT/IT2018/000040
§ 371 (c)(1),
(2) Date: Sep. 6, 2019

(87) PCT Pub. No.: WO2018/173083
PCT Pub. Date: Sep. 27, 2018

(65) Prior Publication Data
US 2021/0146513 A1 May 20, 2021

(30) Foreign Application Priority Data
Mar. 24, 2017 (IT) .......................... 102017000032723

(51) Int. Cl.
*B25B 23/142* (2006.01)
*G06K 7/10* (2006.01)
*G06K 7/14* (2006.01)

(52) U.S. Cl.
CPC ...... *B25B 23/1425* (2013.01); *G06K 7/10366* (2013.01); *G06K 7/1413* (2013.01); *G06K 7/1417* (2013.01)

(58) Field of Classification Search
CPC .......................... B25B 23/1425; G06K 7/10366
(Continued)

(56) References Cited

U.S. PATENT DOCUMENTS

2003/0105599 A1   6/2003   Fisher et al.
2005/0223856 A1  10/2005   Reynertson et al.
(Continued)

FOREIGN PATENT DOCUMENTS

EP   2159006 A1   3/2010
EP   2722132 A2   4/2014
(Continued)

OTHER PUBLICATIONS

International Search Report and Written Opinion dated Jul. 25, 2018 for counterpart International Application No. PCT/IT2018/000040.
(Continued)

*Primary Examiner* — Toan C Ly
(74) *Attorney, Agent, or Firm* — Shuttleworth & Ingersoll, PLC; Timothy J. Klima

(57) ABSTRACT

A torque wrench for controlled tightening of threaded couplings, including a substantially tubular body, a grip positioned at a first end of said tubular body, a tightening head positioned at a second end of said tubular body, a tightening torque setting mechanism positioned inside said tubular body, an indicating device for indicating when the tightening torque set has been reached, a recognition device for recognising an element to be tightened and/or elements that are positioned at the element to be tightened, said recognition device being connected to said tubular body, preferably at said second end, and a control unit connected to said recognition device and designed to associate with the element recognised by said recognition device a tightening torque design value to be set.

15 Claims, 2 Drawing Sheets

(58) Field of Classification Search
USPC .............................................. 81/479; 235/376
See application file for complete search history.

(56) References Cited

U.S. PATENT DOCUMENTS

| | | |
|---|---|---|
| 2008/0115589 A1 | 5/2008 | DeRose et al. |
| 2011/0023280 A1 | 2/2011 | Renke |
| 2012/0234569 A1 | 9/2012 | Lawton et al. |
| 2013/0186951 A1* | 7/2013 | Zhu .................. F16B 31/02 |
| | | 235/375 |
| 2015/0247745 A1* | 9/2015 | McClogan .......... B25B 23/1425 |
| | | 702/33 |

FOREIGN PATENT DOCUMENTS

| | | |
|---|---|---|
| JP | H07164343 A | 6/1995 |
| JP | 2018103299 A | 7/2018 |
| WO | 2013085675 A1 | 6/2013 |

OTHER PUBLICATIONS

Japanese Office Action dated Aug. 31, 2021 from counterpart Japanese Patent Application No. 2019-552632.
European Office Action dated Sep. 2, 2021 from counterpart European Patent Application No. 18729504.3.
Canadian Office Action dated Nov. 29, 2021 from counterpart Canadian Patent Application No. 3,054,876.
Japanese Office Action dated May 10, 2022 from counterpart Japanese Patent Application No. 2019552632.
Canadian Office Action dated Aug. 10, 2022 from counterpart Canadian Patent Application No. 3,054,876.

* cited by examiner

TORQUE WRENCH AND METHOD FOR CONTROLLED TIGHTENING OF THREADED COUPLINGS USING A TORQUE WRENCH

This application is the National Phase of International Application PCT/IT2018/000040 filed Mar. 20, 2018 which designated the U.S.

This application claims priority to Italian Patent Application No. 102017000032723 filed Mar. 24, 2017, which application is incorporated by reference herein.

TECHNICAL FIELD

This invention relates to a torque wrench and a method for controlled tightening of threaded couplings by means of a torque wrench.

The torque wrench is a wrench used for the controlled tightening of screws, nuts and bolts to the correct torque value by means of a mechanism able to indicate when the torque value set has been reached.

The torque wrench is used when the tightening is important to avoid damaging the thread or to guarantee homogeneous loading in a mechanical part held in its seat by multiple screws or bolts.

BACKGROUND ART

There are various types of torque wrenches, one of the most widespread and precise being the click type, in which the tightening value is set by rotating the grip or an extractable control rod and it is read on the body of the wrench or on a small dial gauge indicator. With the socket mounted on the square connection, the wrench is used as a normal tool for sockets. A click indicates when the tightening torque set has been reached.

The control mechanism is contained in the wrench grip and is basically a sturdy spring whose pre-loading by the control handle or rod determines the tightening value. The square connection where the socket engages is prevented from rotating by a tooth held in position by a ball which presses on the head of the spring. When the tightening value set is reached, the opposing spring yields and the ball is lowered, the tooth disengaging the square connection, which is therefore released with an audible click sound.

Another, more recent, type of torque wrench is the electronic type, in which measuring is carried out by means of a strain gauge connected to the torsion rod. The strain gauge transducer generates a signal that is converted to the required unit of torque and shown on a digital display. A number of different tightening toque limit values can be saved in the torque wrench and are shown on the display or by means of LEDs during tightening. The wrench can also store the actual torque values reached during operation, which can then be transferred to a computer or printer. In some electronic wrenches it is also possible to measure the tightening angle by means of a sensor or a gyroscope.

When tightening with a torque wrench, the operator must identify the element (screw, nut, bolt, etc.) to be tightened, find the tightening torque value corresponding to that particular element, for example by consulting manuals or databases, set the value required in the torque wrench and tighten the element until the value set has been reached.

Setting the correct value is fundamental and is currently not easy to do, above all if the tightening operation must be performed rapidly. In fact, it is always necessary to consult a manual or a database containing the tightening value corresponding to the element to be tightened and then act on the wrench to set that value. In electronic wrenches the value is usually set by means of buttons adjacent to the display. In click type wrenches, the operator must act on the grip or the control rod and make sure that the value has been set correctly. Therefore, this operation is not error-free, since it is possible both to associate the wrong torque value with the element to be tightened, and to enter a wrong data item in the torque wrench, by pressing the buttons or adjusting the grip incorrectly.

DISCLOSURE OF THE INVENTION

The aim of this invention is to perform controlled tightening by means of a torque wrench in which the setting of the torque value corresponding to the element to be tightened is free of errors, easy and reliable.

According to this invention, a torque wrench is supplied having features as disclosed herein.

The fact that the torque wrench recognises the element to be tightened and associates with the element the tightening torque design value, that is to say, the torque value assigned to that particular element at the design stage, means that the design value is found quickly and without the operator having to consult manuals or databases. Moreover, the design value is always the correct value, since it is uniquely associated with the element which is recognised by the wrench.

Preferably, the control unit is operatively interposed between the recognition device and the tightening torque setting mechanism, for operating the tightening torque setting mechanism and automatically setting the tightening torque design value corresponding to the element recognised. In particular, in a click type torque wrench in which the tightening torque setting mechanism is activated by rotating the grip or an adjusting ring nut positioned at the first end, the wrench comprises an electric motor interposed between the control unit and the grip or the adjusting ring nut, for rotating the grip or the adjusting ring nut depending on the tightening torque design value that the control unit associated with the element recognised. By means of automatic setting of the tightening toque value in the wrench, without operator intervention, errors during entry of the value using buttons or manual rotation of the grip are avoided.

Advantageously, the control unit comprises a data entry interface and/or a system for Wi-Fi connection or for connection by means of portable memory devices. In this way, it is possible to enter or acquire from a remote unit the data relating to the design values for each element to be tightened and to save it in the wrench.

Preferably, the recognition device comprises a bar code reader or a QR code reader or an RFID tag reader or a video camera, which can allow detection of a code on the element and/or of elements adjacent to the one to be tightened, and can easily be connected to the control unit.

The invention also relates to a method for controlled tightening of threaded couplings by means of a torque wrench comprising steps as disclosed herein.

Advantageously, the step of associating the corresponding tightening torque design value with the element to be tightened comprises reading the tightening torque design value assigned to the element in a database saved in a control unit of said torque wrench and/or in a remote unit. Preferably, the reading in a database saved in a remote unit occurs by means of Wi-Fi or by means of portable memory devices that can be connected to said torque wrench. In this way, it is always possible to have available data that is up-to-date and complete, which can also be downloaded on-line. If the tightening value to be applied to a predetermined element is modified, it will therefore be possible to associate the latest value entered in the database, thereby avoiding using values that are not up-to-date.

Advantageously, the method comprises the steps of detecting the actual tightening torque value corresponding to a predetermined element after it has been tightened; associating the actual tightening torque value with the element tightened; and saving the actual tightening torque value associated with the element tightened. This allows saving of the particular tightening values corresponding to specific elements and easy checking of which elements have already been tightened, which have still not been tightened and if tightening occurred to the correct torque value. Preferably, the data relating to the tightening torque value saved and associated with the element tightened is transferred from the torque wrench to a remote database, for example for use in display programs for checking the elements tightened.

In an advantageous embodiment, the method comprises recognising the element to be tightened and its position on a component or relative to other elements to be tightened. In particular, the method comprises consulting a database to search for elements to be tightened which may be located in that position so as to obtain a list of possible elements to be tightened, comparing the list and the element to be tightened recognised, and associating with the element recognised the corresponding tightening torque design value to be set in the torque wrench if the element to be tightened recognised corresponds to an element on the list.

This allows the correct torque value to always be set if the same element is to be tightened to different torque values depending on the component in which it is used.

BRIEF DESCRIPTION OF THE DRAWINGS

Further advantages and features of this invention are more apparent in the detailed description which follows, with reference to the accompanying drawings, which illustrate an example of it without limiting the scope of the invention, in which.

DETAILED DESCRIPTION OF PREFERRED EMBODIMENT OF THE INVENTION

Figure 1:
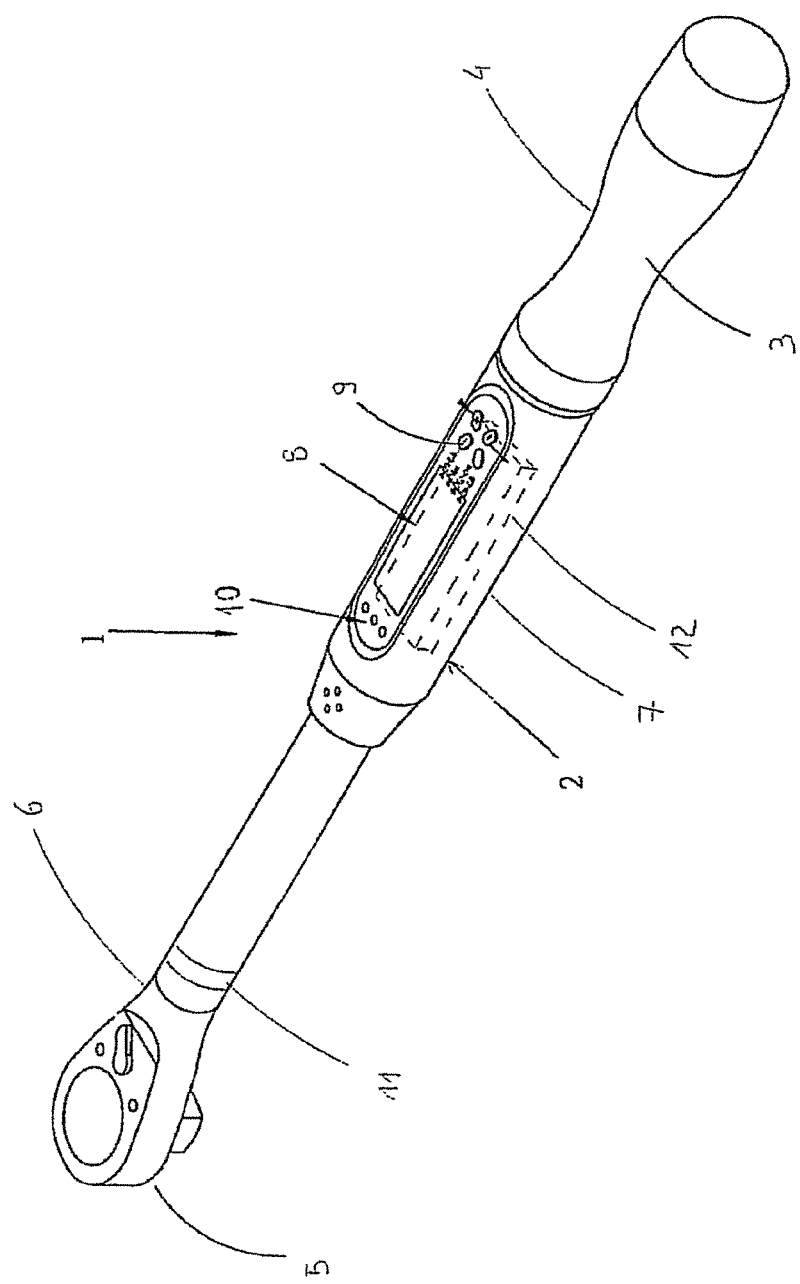
FIG. 1 illustrates a first embodiment of a torque wrench according to the invention.

In FIG. 1 the numeral 1 denotes a torque wrench according to a first embodiment of the invention, for controlled tightening of threaded couplings (screws, nuts, bolts and the like).

The torque wrench 1 is of the electronic type and comprises a substantially tubular body 2 having a grip 3 at a first end 4 and a tightening head 5 at a second end 6. At the central portion 7 of the tubular body 2 there is a display 8 and an interface 9 provided with data entry buttons.

Inside the tubular body 2 there is a tightening torque setting mechanism, of the known type and therefore not illustrated. There is also an indicating device 10 for indicating when the tightening torque set has been reached, comprising for example an LED indicator, or by means of an acoustic signal or a vibration of the wrench body.

According to this invention, the torque wrench 1 comprises a recognition device 11 for recognising an element to be tightened and/or elements that are positioned at the element to be tightened. The recognition device 11, for example a bar code reader, or a QR code reader or an RFID tag reader or a video camera, is connected to the tubular body 2. Preferably, the recognition device 11 is positioned at the second end 6 of the tubular body 2, so that, in use, it is located near the element to be tightened.

The torque wrench according to the invention also comprises a control unit 12 connected to the recognition device 11 (the connection is not shown in the figure). The control unit 12 is suitable for associating with the element recognised by the recognition device 11 a tightening torque design value to be set in the wrench. In the embodiment in FIG. 1, advantageously, the control unit 12 is operatively interposed between the recognition device 11 and the tightening torque setting mechanism, so as to operate the tightening torque setting mechanism for automatically setting the tightening torque value corresponding to the element recognised. In the embodiment of FIG. 1, the control unit 12 is positioned inside the tubular body 2 and is also connected to the display 8, to the data entry interface 9 and to the indicating device 10.

The controlled tightening method according to this invention by means of the torque wrench of FIG. 1 comprises moving the torque wrench 1 near to an element to be tightened and recognising the element to be tightened and/or elements positioned at the element to be tightened by means of the recognition device 11.

In fact, depending on the use, it is possible to recognise the element to be tightened based on codes present on the element itself, or based on the position of the element relative to other elements which constitute the part to be mounted.

The recognition device 11 sends the data about the element to tightened to the control unit 12 in which there are present or to which it is possible to transmit the tightening torque design values assigned to a specific element. The tightening torque design values uniquely associated with predetermined elements can be entered in the control unit by means of portable electronic devices such as a USB flash drive or downloaded from a computer or from the internet, preferably by means of a Wi-Fi connection.

The control unit 12 associates with the element recognised the corresponding tightening torque design value which must be set in the torque wrench. Preferably, the design values assigned to each element are read in a database saved in the control unit 12 or in a remote unit. If they are saved in a remote unit, the reading may occur by means of Wi-Fi or by means of portable memory devices that can be connected to the torque wrench, such as a USB flash drive.

Advantageously, in the embodiment in FIG. 1, the design value associated with the element recognised is automatically set in the torque wrench, by means of the connection between the control unit 12 and the tightening torque setting mechanism. Then the element is tightened until the tightening torque set in the torque wrench is reached.

Advantageously, the method for controlled tightening of threaded couplings comprises detecting the actual tightening torque value corresponding to a predetermined element, associating the actual value with the element tightened and saving the actual tightening value associated with the element tightened. Therefore, compared with prior art wrenches, use is made not just of a list of tightening values, but the particular tightening values corresponding to specific elements. Saving this data therefore allows easy checking of which elements have already been tightened, which have still not been tightened and if tightening occurred to the correct torque value. The data saved can be entered in a display program, for example an application on a tablet, which uses different colours to show which elements have already been tightened with the correct torque, which have not been tightened and elements tightened with the wrong torque.

In an advantageous embodiment, the method comprises both recognising the element to be tightened and recognising elements positioned at the element to be tightened.

The elements positioned at the element to be tightened may be a component on which the element to be tightened is located and/or other elements to be tightened. In this way, the position of the element to be tightened is identified. In fact, there may be situations in which the same element must be tightened to different torque values depending on the component in which it is used. For example, a screw of a particular type used in a front suspension will have to be tightened to a torque value that is less than that for the same screw located in a rear suspension.

In the advantageous embodiment in which the element to be tightened and its position on a component or relative to other elements to be tightened is recognised, the method comprises a step of consulting a database to search for which elements to be tightened may be located in that position. The database may be saved in the control unit 12 or in a remote unit. The control unit 12 then supplies a list of possible elements to be tightened. The control unit 12 then compares the list with the element actually recognised. If the element actually recognised corresponds to an element on the list, then the control unit 12 associates with that element the tightening torque value to be applied.

Advantageously, a signal or alarm message may be sent if no match is found between the elements on the list and the element to be tightened that was actually recognised.

One possible embodiment of this method is, for example, tightening of a threaded coupling such as a screw or a stud bolt, positioned on a particular component.

The recognition device, for example a video camera, detects the screw and the zone of the component on which the screw to be tightened is located. The data about the type of screw and the zone are sent to the control unit. The control unit accesses the database and searches for which screws may be located in that zone of the component. The control unit creates a list of the screws which may be located in that zone of the component and compares it with the screw detected. If there is no match, it sends a signal or alarm message. If it finds a match between the screw and the zone of the component, then it assigns a predetermined tightening torque value corresponding to that particular screw in that particular zone. Preferably, the tightening torque is automatically set in the wrench in such a way as to operate the mechanism for setting the torque to the correct value.

Figure 2:
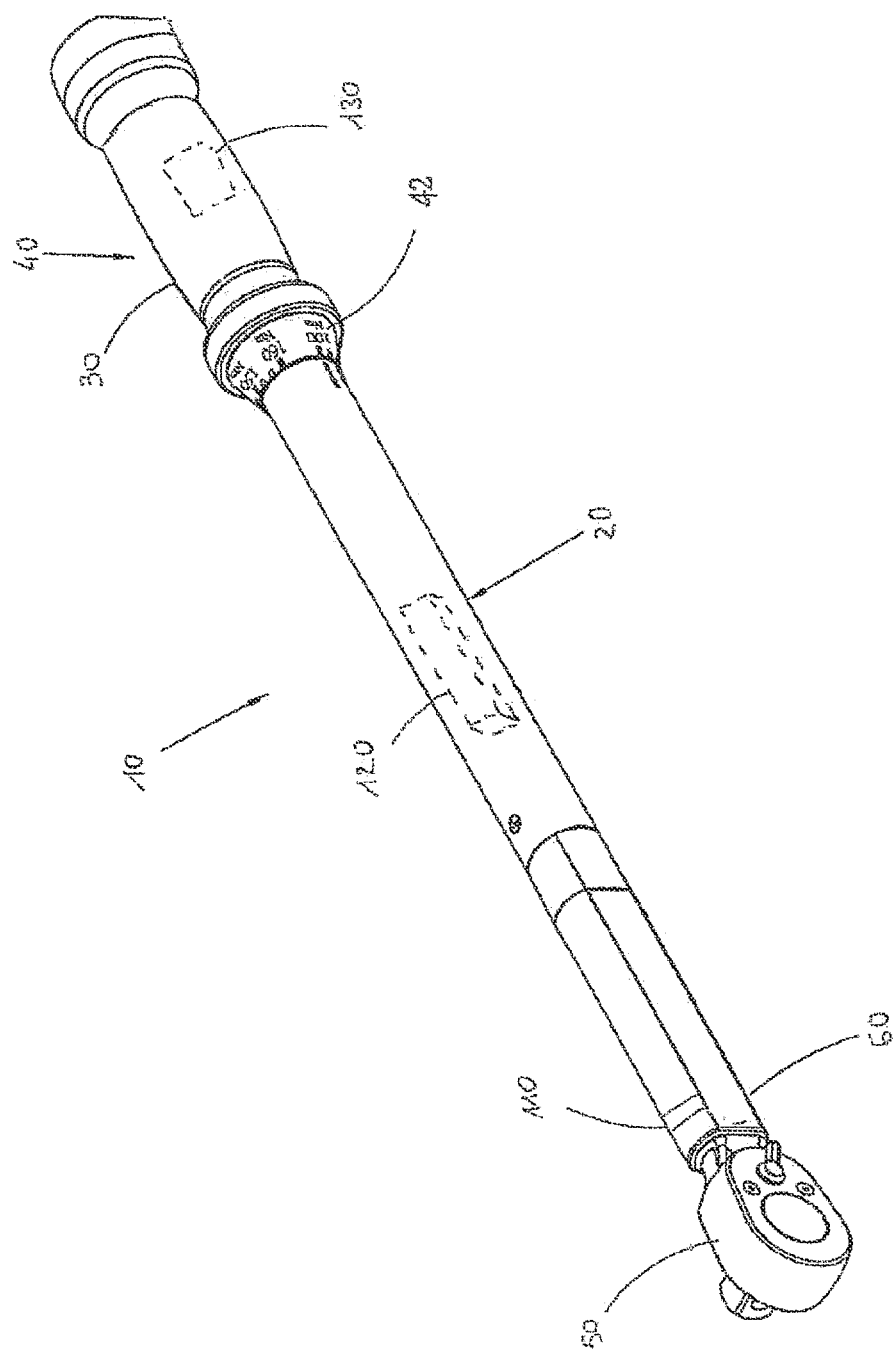
FIG. 2 illustrates a second embodiment of the torque wrench according to the invention.

In FIG. 2 the numeral 10 denotes a second embodiment of a torque wrench according to the invention.

The torque wrench 10 is of the click type and comprises a substantially tubular body 20 having a grip 30 at a first end 40 and a tightening head 50 at a second end 60. Between the grip 30 and the tubular body 20 there is a dial 42 for indicating the tightening torque, which is set by rotating the grip 30 in such a way as to vary the pre-loading of a spring (not illustrated) present inside the tubular element 20, which is part of the tightening torque setting mechanism, of the known type. In the wrench in FIG. 2 the indicating device for indicating when the tightening torque set has been reached comprises, as is known, a tooth held in position by a ball which presses on the head of the spring.

In an alternative embodiment not illustrated, the click type torque wrench 10 comprises an adjusting ring nut positioned at the first end 40 and the tightening torque is set by rotating the ring nut in such a way as to vary the pre-loading of the spring.

Again in the embodiment in FIG. 2, the torque wrench 10 comprises according to the invention a recognition device 110 for recognising an element to be tightened and/or elements that are positioned at the element to be tightened. The recognition device, for example a bar code reader, or a QR code reader or an RFID tag reader or a video camera, is connected to the tubular body 20, preferably at the second end 60.

As in the embodiment in FIG. 1, the torque wrench 10 disclosed in FIG. 2 comprises according to the invention a control unit 120 connected to the recognition device 110 (the connection is not illustrated in the figure) and suitable for associating with the element recognised by the recognition device 110 a tightening torque design value to be set in the wrench.

In an embodiment not illustrated, the click type torque wrench may have a display on which it indicates the value to be set by means of manual rotation of the grip 30 or of the adjusting ring nut.

Advantageously, in the embodiment in FIG. 2, the control unit 120 is operatively interposed between the recognition device 110 and the tightening torque setting mechanism. In particular, the control unit 120 is connected to an electric motor 130 which drives the rotation of the grip 30 for automatically setting the tightening torque corresponding to the element without operator intervention.

In the wrench in which the tightening torque is set by rotating the adjusting ring nut, the control unit 120 is connected to an electric motor 130 which drives the rotation of the ring nut.

The controlled tightening method according to this invention by means of the torque wrench of FIG. 2 is similar to that which uses the torque wrench of FIG. 1.

The invention claimed is:

1. A torque wrench for controlled tightening of threaded couplings, comprising:
   a tubular body,
   a grip positioned at a first end of said tubular body,
   a tightening head positioned at a second end of said tubular body,
   a tightening torque setting mechanism positioned inside said tubular body for setting a reference tightening torque which has to be reached and not to be exceeded,
   an indicating device for indicating when the set reference tightening torque has been reached,
   a recognition device for recognizing an element to be tightened and/or elements that are positioned at the element to be tightened, said recognition device being connected to said tubular body, and
   a controller connected to said recognition device and configured to associate a corresponding tightening torque design value with the element to be tightened,
   wherein the controller is operatively interposed between the recognition device and the tightening torque setting mechanism so as to derive the tightening torque design value from the recognition device and directly operate the tightening torque setting mechanism for automatically setting as a reference the tightening torque design value associated with the element recognized without operator intervention on the tightening torque setting mechanism;

wherein the tightening torque setting mechanism is configured to be adjusted by rotating said grip or an adjusting ring nut positioned at said first end,
an electric motor interposed between said controller and said grip or said adjusting ring nut, for rotating said grip or said adjusting ring nut to adjust the tightening torque setting mechanism to the corresponding tightening torque design value.

2. The torque wrench according to claim 1, wherein said controller comprises a data entry interface and/or a system for Wi-Fi connection or for connection via a portable memory device.

3. The torque wrench according to claim 1, wherein said recognition device comprises at least one chosen from the group of a bar code reader or a QR code reader or an RFID tag reader or a video camera.

4. The torque wrench according to claim 1, wherein the controller is configured to:
  detect an actual tightening torque value corresponding to the element to be tightened after having tightened the element to be tightened;
  associate the actual tightening torque value with the element tightened;
  save the actual tightening torque value associated with the element tightened;
  display for a plurality of elements to be tightened which elements have already been tightened with the correct torque, which have not been tightened and elements tightened with the wrong torque.

5. The torque wrench according to claim 1, wherein the recognition device is attached to the second end of the tubular body, spaced apart from the tightening head.

6. A method for controlled tightening of threaded couplings using a torque wrench, comprising the steps of:
  moving the torque wrench near to an element to be tightened, the element to be tightened having a corresponding tightening torque design value;
  recognizing the element to be tightened and/or elements positioned at the element to be tightened;
  associating with the element to be tightened the corresponding tightening torque design value to be set as a reference in the torque wrench;
  automatically operating a tightening torque setting mechanism in the torque wrench for setting as a reference in the torque wrench the tightening torque value associated with the element recognized without operator intervention on the tightening torque setting mechanism;
  performing the automatically operating the tightening torque setting mechanism by providing an electric motor connected to the tightening torque setting mechanism and using the electric motor to adjust the tightening torque setting mechanism to the corresponding tightening torque design value;
  engaging the torque wrench with the element to be tightened and tightening the element to be tightened until the reference tightening torque value set in the torque wrench has been reached.

7. The method according to claim 6, wherein said step of associating the corresponding tightening torque design value with the element to be tightened comprises reading the corresponding tightening torque design value assigned to the element in a database saved in a controller of said torque wrench and/or in a remote unit.

8. The method according to claim 7, wherein the reading of the corresponding tightening torque design value in a database saved in a remote unit occurs by means of Wi-Fi or by means of portable memory devices that can be connected to said torque wrench.

9. The method according to claim 6, and further comprising the steps of:
  detecting an actual tightening torque value corresponding to the element to be tightened after having tightened the element to be tightened;
  associating said actual tightening torque value with the element tightened;
  saving the actual tightening torque value associated with the element tightened.

10. The method according to claim 9, and further comprising a step of transferring from the torque wrench to a remote database the data relating to the corresponding tightening torque design value saved and associated with the element tightened.

11. The method according to claim 6, and further comprising recognizing the element to be tightened and its position on a component or relative to other elements to be tightened.

12. The method according to claim 11, and further comprising the steps of:
  consulting a database in order to search for elements to be tightened which may be located in said position;
  obtaining a list of possible elements to be tightened;
  comparing said list with the element to be tightened that was recognized;
  if the element to be tightened that was recognized corresponds to an element on the list, associating with the element recognized the corresponding tightening torque design value.

13. The method according to claim 9, and further comprising a step of entering in a display program the saved actual tightening torque value associated with the element tightened for a plurality of elements to be tightened, wherein the display program is adapted to show which elements have already been tightened with the correct torque, which have not been tightened and elements tightened with the wrong torque.

14. The method according to claim 6, and further comprising recognizing the element using a recognition device attached to a second end of a tubular body of the torque wrench, spaced apart from a tightening head of the torque wrench.

15. A torque wrench for controlled tightening of threaded couplings, comprising:
  a tubular body,
  a grip positioned at a first end of said tubular body,
  a tightening head positioned at a second end of said tubular body,
  a tightening torque setting mechanism positioned inside said tubular body for setting a reference tightening torque which has to be reached and not to be exceeded,
  an indicating device for indicating when the set reference tightening torque has been reached,
  a recognition device for recognizing an element to be tightened and/or elements that are positioned at the element to be tightened, said recognition device being connected to said tubular body, and
  a controller connected to said recognition device and configured to associate a corresponding tightening torque design value with the element to be tightened,
  wherein the controller is operatively interposed between the recognition device and the tightening torque setting mechanism so as to derive the tightening torque design value from the recognition device and directly operate the tightening torque setting mechanism for automatically setting as a reference the tightening torque design value associated with the element recognized without operator intervention on the tightening torque setting mechanism;
wherein the recognition device is attached to the second end of the tubular body, spaced apart from the tightening head.

\* \* \* \* \*